United States Patent Office 3,377,992
Patented Apr. 16, 1968

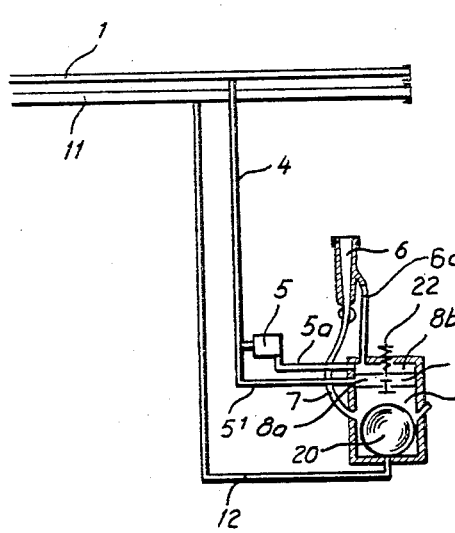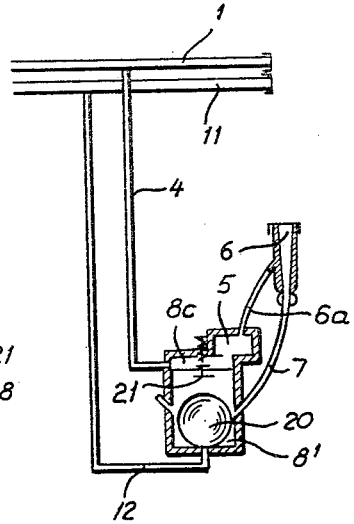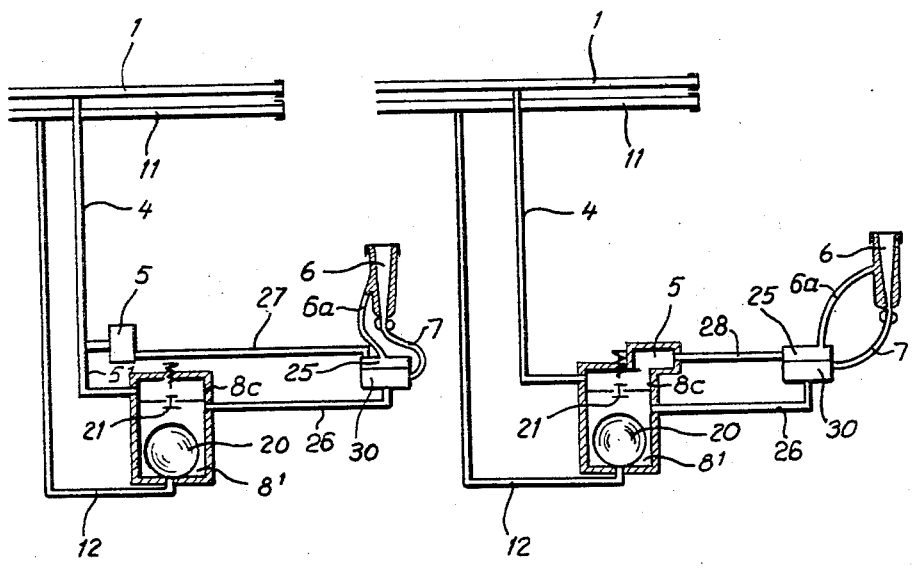

3,377,992
MILKING SYSTEM
Engelbert Baum, Vienna, Austria, assignor to Alfa-Laval AB, Stockholm, Sweden, a corporation of Sweden
Filed Aug. 12, 1964, Ser. No. 389,074
3 Claims. (Cl. 119—14.08)

This invention relates to machine milking systems of the type having an operating pipe subjected to a vacumn and milk-collecting pipe subjected to a higher vacuum and to which the mlik claw of the teat cups is connected.

A pressure-regulating valve, known as an equalizing valve, is normally provided to maintain the vacuum which prevails in the milk-collecting pipe and which indirectly acts upon the udder of the cow, at the physiologically best suited value (380 mm. Hg). However, this vacuum cannot be maintained constantly at the desired value by such a valve, as the pressure prevailing in the milk-collecting pipe is subjected to variations which appear especially in pipeline milking plants wherein the discharge of the milk offers substantial and variable resistances. These variations are superimposed on the vacuum prevailing in the collecting pipe and thus lead to variations of the milking vacuum, which have a detrimental effect upon the milking result.

The present invention eliminates this drawback in milking systems of the type described. According to the invention, the milk claw (or a separate, additional container connected to the claw) is connected through an additional pipe to the operating pipe where the milking vacuum is maintained at a constant value. Thus, unlike previously known systems, pressure variations occurring in the milk-discharge pipe cannot influence the milking vacuum applied to the teat cups. Moreover, it is possible to use, for the discharge of the milk from the container, a vacuum which is substantially higher than the milking vacuum in order to ensure a reliable conveyance of the milk (as when height differences must be overcome). As usual, the milking vacuum is used for the operation of the pulsator.

The milking vacuum and the higher vacuum in the milk-collecting pipe may be generated in different ways as by two pumps for maintaining the two different vacuums, respectively, or by a single pump and a system of regulating valves, as disclosed more in detail hereinafter.

In order to cause the milk to flow from the container in as continuous a stream as possible and without air occlusions (which, as known, may be detrimental to the quality of the milk), it is preferable to provide valve means, such as a float valve, responsive to the low milk level in the container for closing its connection to the milk-collecting pipe when the low level is reached, thereby preventing the higher vacuum prevailing in the milk-collecting pipe from sucking air from the container (in which a lower vacuum prevails) and drawing it through the milk-collecting containers.

It is also desirable to ensure that a reduction of the vacuum in the system, as by the dropping off of a teat cup, does not spread through the system, which could easily lead to the dropping off of other teat cups. According to a further feature of the invention, this problem is solved by providing the pipe for the milking vacuum with a valve which is automatically shut in response to a loss of vacuum in the container, this valve reopening only after the vacuum prevailing in the container has again reached a determined value.

Control of the discharge of the milk from the container in accordance with the milk level in the container can be easily achieved by a float-control which also serves to operate a device for closing the pipe connection from the container to the milking vacuum pipe when the milk level becomes too high.

Embodiments of the invention are described below with reference to the accompanying drawings, in which:

FIGS. 3, 4, 5 and 6 are schematic views of the system showing other modifications.

Figure 1:
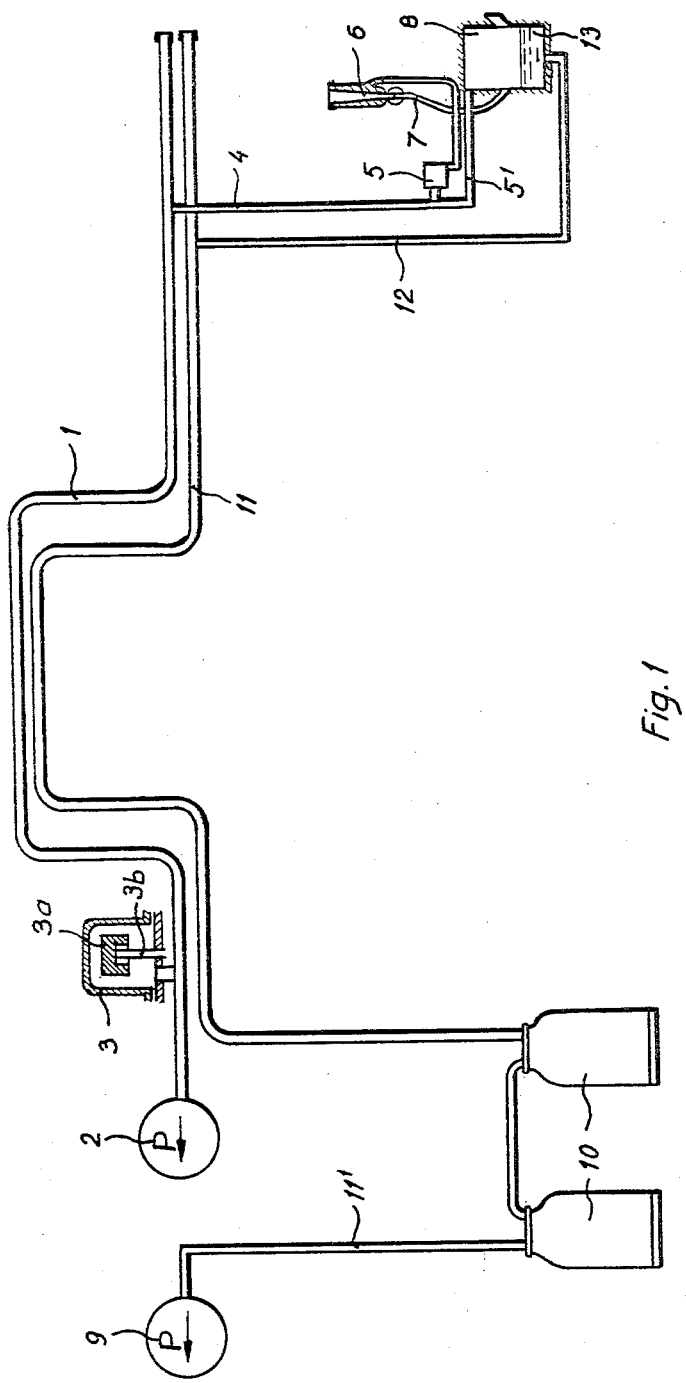
FIG. 1 is a schematic view of one form of the new system, showing separate vacuum pumps for the operating or milking vacuum pipe and the milk-collecting pipe, respectively.

In FIG. 1, reference numeral 1 designates the operating vacuum pipe for the milking vacuum, which is connected to a vacuum pump 2 and is provided with an equalizing valve 3. Pipe 1 is connected through a hose 4 and a conventional pulsator 5 to the usual inflation chamber of teat cup 6. The latter has the usual milk outlet tube 7 which, as shown, leads to a closed container or claw 8. It will be understood that the other three teat cups (not shown) of the milking unit are similarly or suitably connected so that their inflation chambers are pulsated by alternate connection to vacuum pipe 1 and atmosphere and so that their milk tubes lead into the container 8. The upper portion of container 8 is connected to the pipe 4 through a duct 5' which by-passes the pulsator 5 and thus subjects the container to the substantially constant milking vacuum in pipe 1. The lower portion of the container is subjected to the higher vacuum generated by the pump 9 and acting through pipe connection 11', milk pails 10, milk pipeline 11 and its branch hose 12 leading from the container bottom, the parts 11 and 12 being referred to generally as a milk-collecting pipe.

The operating vacuum in pipe 1 is maintained constant in the usual manner by the automatic valve 3, the degree of vacuum being determined by the magnitude of the weight 3a which controls intake of atmospheric air through venting tube 3b. The pulsator and the teat cup, with its usual shell containing the liner or inflation, operate in the conventional manner so that milk flows into the container, as shown at 13. From container 8, the milk is conveyed into the pails 10 through the pipe 12–11. It is evident that the vacuum maintained by the valve 3 prevails at a substantially constant value above the level of milk 13 in container 8, due to the connecting duct 5'. Moreover, the milk-collecting pipe 11–12 may be maintained under a considerably higher vacuum than the milking vacuum in pipe 1, without giving rise to unduly high vacuums in the teat cup liner, because the two different vacuums do not exert any influence on each other.

Figure 2:
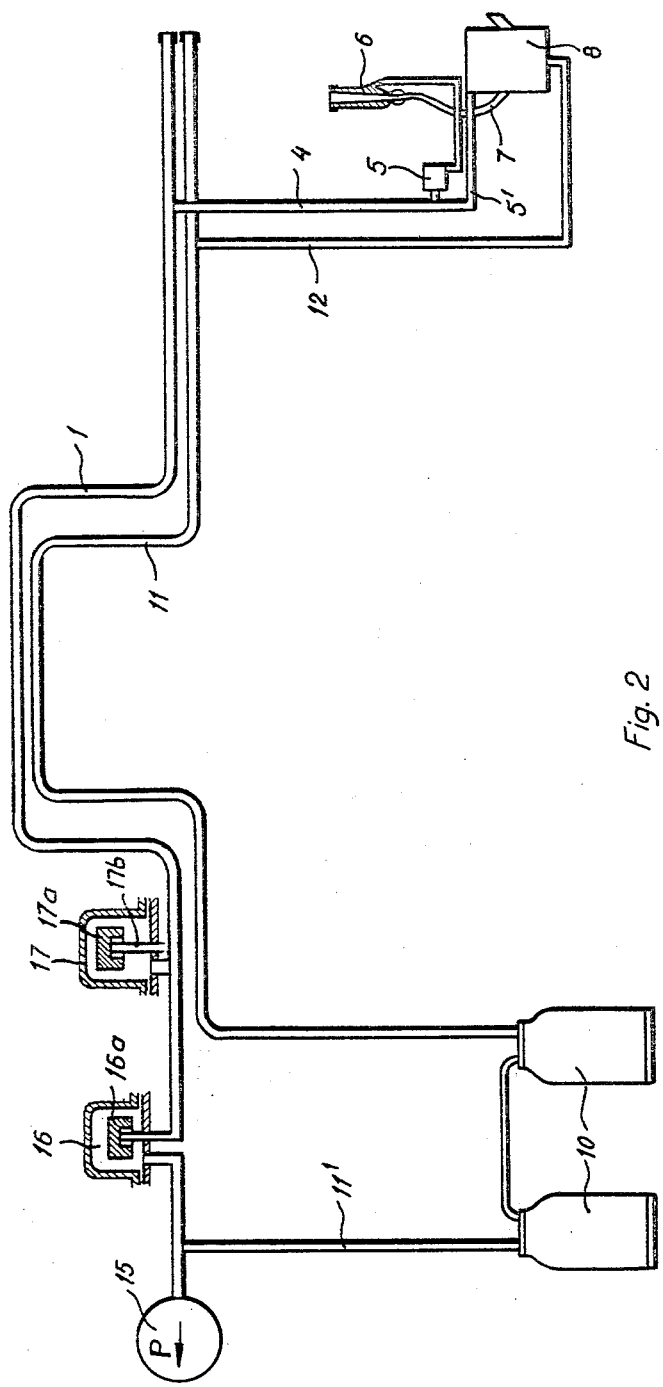
FIG. 2 is a view similar to FIG. 1 but showing a single vacuum pump for both pipes.

The system shown in FIG. 2 operates in principle in the same manner as the system shown in FIG. 1 and the corresponding parts are designated by the same reference numerals. The difference is only that the different vacuums are generated by one and the same pump 15, which maintains a high vacuum in the milk-collecting parts 10–11–12 but a lower vacuum in pipe 1 through two valves 16 and 17. The valve 17 limits the intensity of the vacuum prevailing in the pipe 1, in that the weight 17a opens the venting tube 17b to admit atmospheric air as soon as the vacuum in the pipe 1 becomes too high. The weight 16a of valve 16 is calibrated so that the vacuum on the pump side of the valve 16 is higher than the vacuum in pipe 1, whereby the vacuum in the pipe 11 is higher (stronger vacuum) than in the pipe 1.

While only one milking unit (parts 4 through 8 and 12) is shown in each of FIGS. 1 and 2, it is evident that the system will not be basically modified by the connection of more than one milking unit to the pipes 1 and 11. Although the container 8 may serve more than one milking unit, it is preferable to provide a separate container 8 for each such milking unit.

In the embodiments according to FIGS. 1 and 2, it may occur that the high vacuum (low pressure) prevailing in the pipes 11–12 completely exhausts milk from the containers 8, which would result in the flow of air from pipe 4 into the pipe 12 from which it would be drawn through the collected milk, this being generally undesirable. This phenomenon can be avoided by the embodiments of the invention shown in FIGS. 3 through 6.

Referring to FIG. 3, the container 8 is provided at the top with a hollow section 8a forming an extension of duct 5' and communicating with the upper interior of the container through a valve 21. Mounted on section 8a but closed from the interior thereof is another hollow section 8b through which the pulsation tube 6a of the teat cup 6 communicates with pipe 4 by way of tube 5a and pulsator 5. By valve means shown as a float 20 in the container, the connecting point of the pipe 12 to the container 8 can be shut off or opened. When the milk in the container 8 has been nearly entirely exhausted, whereupon air would be sucked into the pipe 12, the float 20 settles on the orifice of the pipe 12 and shuts it off and will open it again only after sufficient milk has been collected in the container 8 to lift the float 20 and thus resume the discharge of milk into pipe 12.

If, for any reason, a teat cup 6 drops off, air will flow into the chamber 8 from milk tube 7, causing an increased flow of air through the valve 21. The latter is of a conventional type which is closed by this increased air flow, or by the increased pressure in container 8 which causes the increased air flow. Thus, the loss of vacuum in container 8 is prevented from causing loss of vacuum in the remaining teat cups connected to the system, which would cause them to fall off the teats. As soon as the fallen teat cup is replaced on the cow, the valve 21 may be reopened from outside by means of a push-rod 22 having a sealed sliding fit in hollow section 8b, or the valve may be arranged in such way that it opens automatically as soon as the air flow through milk tube 7 stops. It could also occur that the milk in the container 8 rises continuously due to a stoppage of the milk discharge from the container. The float 20 will then strike against the normally open valve 21 and raise it to its closed position, where it will be retained (due to the vacuum prevailing in the chamber 8a) until it opens again after the stoppage has been corrected, whereupon the system again operates normally. The hollow section 8b may serve as a pulsation distributor for all four of the teat cups of a milking unit.

In FIG. 4, the container 8' has a hollow top 8c forming a duct through which the upper portion of the container interior communicates with pipe 4, the valve 21 serving the same function as in FIG. 3. The pulsator 5 is integrated with the hollow top 8c.

In FIGS. 5 and 6, the pulsation distributor 25 is integrated with a milk claw 30 which is connected to container 8' by a tube 26. As shown in FIG. 5, the pulsator 5 is a separate unit connecting pipe 4 to the pulsation distributor through pipe 27; while in FIG. 6 the pulsator 5 is integrated with the hollow top section 8c of container 8' (as in FIG. 4) and is connected through pipe 28 to pulsation distributor 25. The hollow top section 8c in both of these embodiments serves as a duct through which the upper portion of the container interior communicates with pipe 4, directly in FIG. 6 and indirectly through duct 5' in FIG. 5.

In the embodiments according to FIGS. 3 through 6, the reference numeral 8 or 8' is used to designate a container having upper sections 8a and 8b (FIG. 3) or an upper section 8c (FIGS. 4–6), in addition to a main lower section containing the float 20. It will be understood that in each of these embodiments the lower section containing the float 20 constitutes the "claw" specified in the appended claims and through which the milk outlet tube 7 is connected to the milk-collecting pipe 12–11 leading from the lower part of this claw. The valve 21 thus controls the communication from this claw to the duct 8a (FIG. 3) or the duct 8c (FIGS. 4–6) through which the upper part of the claw is connected to the operating vacuum pipe 1 independently of the pulsator 5.

I claim:
1. A milking system comprising an operating vacuum pipe, a teat cup having a pulsation tube and a milk outlet tube, means including a pulsator connecting said pulsation tube to said operating vacuum pipe, a claw connected to the milk outlet tube, a milk-collecting pipe leading from the lower part of said claw, means for maintaining a substantially constant vacuum in said operating vacuum pipe while maintaining a substantially higher vacuum in said milk-collecting pipe, a duct connecting the upper part of the claw to said operating vacuum pipe independently of said pulsator, and a valve positioned to control the communication from the claw through said duct to the operating vacuum pipe and operable to close said communication in response to a substantial increase of the pressure in said upper part of the claw relative to the pressure in the operating vacuum pipe.

2. A system according to claim 1, comprising also means for actuating said valve to re-open said communication.

3. A milking system comprising an operating vacuum pipe, a teat cup having a pulsation tube and a milk outlet tube, means including a pulsator connecting said pulsation tube to said operating vacuum pipe, a claw connected to the milk outlet tube, a milk-collecting pipe leading from the lower part of said claw, means for maintaining a substantially constant vacuum in said operating vacuum pipe while maintaining a substantially higher vacuum in said milk-collecting pipe, a duct connecting the upper part of the claw to said operating vacuum pipe independently of said pulsator, and valve means positioned to control the communication from the claw through said duct to the operating vacuum pipe and operable to close said communication in response to a predetermined high milk level in the claw.

References Cited

UNITED STATES PATENTS

| 2,616,809 | 11/1952 | Graves. | |
| 2,805,643 | 9/1957 | Hill | 119—14.07 |
| 2,920,641 | 1/1960 | Girolo | 119—14.06 X |
| 3,172,391 | 3/1965 | Norton | 119—14.28 |
| 3,187,719 | 6/1965 | Jones | 119—14.08 |

HUGH R. CHAMBLEE, *Primary Examiner.*